July 18, 1944.  L. FLEMMING  2,354,108
COPYING APPARATUS
Filed March 28, 1941
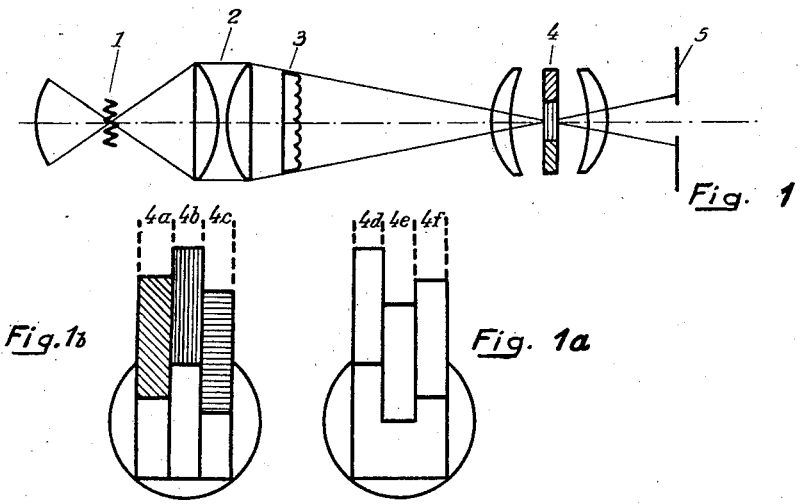
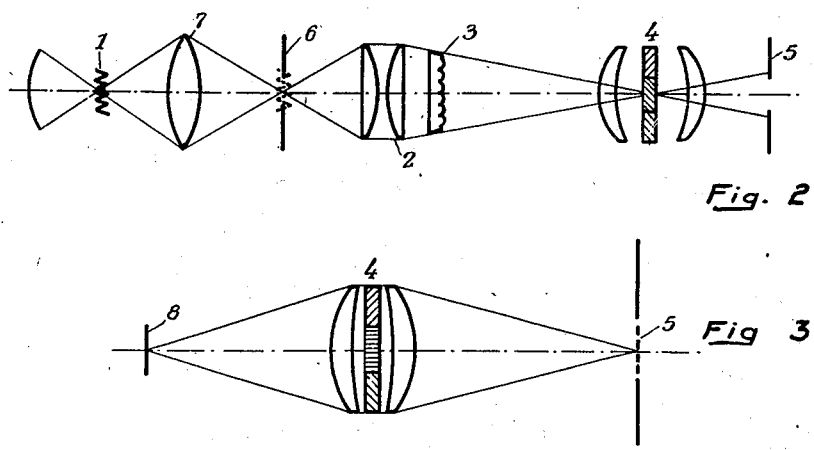
LEOPOLD FLEMMING
INVENTOR.
BY Philip S. Hopkins
William C. Babcock
ATTORNEYS Patented July 18, 1944

2,354,108

UNITED STATES PATENT OFFICE 2,354,108

COPYING APPARATUS

Leopold Flemming, Berlin-Schoneberg, Germany, assignor to General Aniline & Film Corporation, New York, N. Y., a corporation of Delaware Application March 28, 1941, Serial No. 385,588
In Germany March 12, 1940

6 Claims. (Cl. 88—24)

My present invention relates to copying apparatus and more particularly to improvements of the control of the beams of light in copying apparatus for color film.

In the copying of color films it is necessary for compensating for color-tones in the original and copying material to modify the spectral composition of the copying light during copying. Such control of the color has to comply with the following main requirements:

1. The possibility to modify the color of the copying light during copying, since especially with motion pictures it is often necessary to vary the color control on change of scene.

2. An accurate mixture of the different colors of the light, i. e. the whole area of the film gate must uniformly be lighted.

3. A utilization as high as possible of the beam of light emitted by the copying source of light, since on the one hand, especially as to the motion picture the exposure time can be varied only to a very small extent and on the other hand the application of very strong lamps is impossible for technical reasons.

4. The possibility to alter the total intensity of the copying light without modifying the spectral composition simultaneously; the control of the intensity is hence not effected by changing the resistance.

Hitherto the following arrangements have been used for color control:

1. Several sources of light which either preferably emit rays of determined spectral regions (for instance neon-light, mercury vapor light, and fluorescence radiation for the three additive primary colors red, green, and blue respectively) or arc lamps continuously emitting white light and fitted with colored filters.

Such arrangement makes a very high utilization of light possible with corresponding rays. It is, however, relatively complicated (for instance in regulating the total intensity) and requires a large space. Moreover it is desirable to employ only one source of light, since several lamps always differ from one another in intensity of light and in "color temperature."

2. A source of light provided with screen-like filters, generally in the form of stripes or a chessboard, which are positioned behind a suitable diaphragm in such a distance from the film gate that a sufficient mixing of the rays of different colors can be attained, and are adapted to be placed less or more in the path of light.

A disadvantage of this method resides in the very low utilization of light as the diaphragm itself absorbs at least 50% of the rays without filters being inserted. Moreover opal lamps must be employed as sources of light, because it is not possible to use condensed rays, as otherwise an image of the filament in the form of a shadow is obtained in the plane of the film gate and the colors cannot be mixed uniformly.

It is an object of my present invention to provide a method by which the disadvantages mentioned above are overcome.

Another object is the provision of only one source of light and means for uniformly mixing the colored rays.

Further objects of this invention will be seen from the following detailed disclosure.

Reference is made to the accompanying drawing.

Figure 1 diagrammatically shows a modification of the device according to the invention, Figure 1a illustrates details of an adjustable diaphragm for the filter stripes, Figure 1b illustrates details of the adjustable stripe filter, Figure 2 is a view of another modification, an intermediate image of the source of light being produced, and Figure 3 shows a further modification of the device, the source of light consisting of a lighting plane.

The objects of this invention are accomplished by a device in which are provided only one source of light and means for mixing the colored light rays in the film gate as, for instance, a lenticular screen. The path of the rays is illustrated in Figure 1. It corresponds with the projection of a white spot of a normal natural color film and is of advantage inasmuch as the light rays emitted by the source of light are utilized to a large extent since the whole light collected by the condenser can be concentrated in the film gate. Additive as well as subtractive filters—also with additional white light—may be used (Figure 1b). The color control of the copying light may be carried out by partly covering the filter stripes by means of diaphragms or by inserting the filter stripes to a smaller or larger extent in the path of light. The uniformity of the lighting of the film gate is not influenced by partly or wholly covering single filter stripes. Without changing the relative proportion of the filters the total intensity can be varied by grey filters or by producing an intermediate image of the source of light and inserting an adjustable diaphragm at that place (Figure 2). If desired, additional color filters, for instance, adjusted to the copying emulsion used may be arranged in the space unused beside the filter stripes (see Figure 1b). In using a light source having a lighting plane the light beams are controlled in a similar manner without a lenticular screen being arranged (Figure 3). In this case it is disadvantageous that a lighting plane having the same intensity at each point can only be produced under great difficulties and a well-lighted opal disc employed instead of the lighting plane only yields a relatively small amount of light although a greater utilization of the light is obtained by thus controlling the rays than by the method mentioned above in which an opal lamp with filters in the form of stripes or of a chess-board in front of it is used since an essentially larger light-angle is utilized by the lens system than with normal diffused radiation.

The arrangements described above for the purpose of copying can also be applied to projection devices in order to compensate for color tones of the picture to be projected or the projection light.

Referring to the drawing, in Figure 1 there are a source of light 1, a condenser 2, a lenticular screen 3, a lens system with stripe-filters 4, and a copying plane 5. In Figures 1a and 1b, 4a, 4b, and 4c designate the adjustable filter stripes and 4d, 4e, 4f the adjustable diaphragms for the corresponding filter stripes. In Figure 2, 6 designates the diaphragm for regulating the total intensity, an intermediate image of the source of light 1 being produced in the plane of the diaphragm by the lens 7. In Figure 3, 8 designates a lighting plate of which an image is directly obtained in the copying plane 5 by the lens system.

I claim:

1. In a device for projecting colored transparent positives or copying color films, a light system for flooding the transparent positive or color film with light including a source of light, a condenser and an objective, a lenticular screen between the condenser and objective, and a striped filter within the objective and means for varying said striped filter so as to control the colors in the light with which the film is copied or projected.

2. In a device for projecting colored transparent positives or copying color films, a light system for flooding the transparent positive or color film with light including a source of light, a condenser and an objective, a lenticular screen between the condenser and objective, a striped filter within the objective and adjustable diaphragms for the stripes of said filter so as to vary the effect of the filter and thereby control the colors in the light with which the film is copied or projected.

3. In a device for projecting colored transparent positives or copying color films, a light system for flooding the transparent positive or colored film with light including a source of light a condenser and an objective, a lenticular screen between the condenser and objective, and a striped filter within the objective, the stripes in said filter being adjustable to vary their effect on the light with which the film is copied or projected.

4. In a device for projecting colored transparent positives or copying color films, a light system for flooding the transparent positive or color film with light including a source of light, a lens, a condenser and an objective, an adjustable diaphragm between the lens and condenser, a lenticular screen between the condenser and objective, and a striped filter within the objective and means for varying said striped filter so as to control the colors in the light with which the film is copied or projected.

5. In a device for projecting colored transparent positives or copying color films, a film gate, a light system for flooding the transparent positive or color film with light including a source of light a condenser and an objective, means between the condenser and objective for mixing the colored light rays in the film gate, and a striped filter within the objective and means for varying said striped filter so as to control the colors in the light with which the film is copied or projected.

6. In a device for projecting colored transparent positives or copying color films, a film gate, a light system for flooding the transparent positive or color film with light including a source of light, a condenser and an objective, means between the condenser and objective for mixing the colored light rays in the film gate, a striped filter within the objective and adjustable diaphragm for the stripes of said filter so as to vary the effect of the filter and thereby control the colors in the light with which the film is copied or projected.

LEOPOLD FLEMMING.